US011902209B2

United States Patent
Xu

(10) Patent No.: US 11,902,209 B2
(45) Date of Patent: *Feb. 13, 2024

(54) METHODS AND APPARATUSES FOR DETECTING CONTROL CHANNELS IN WIRELESS COMMUNICATION SYSTEMS

(71) Applicant: GUANGDONG OPPO MOBILE TELECOMMUNICATIONS CORP., LTD., Guangdong (CN)

(72) Inventor: Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,250

(22) Filed: Dec. 16, 2021

(65) Prior Publication Data

US 2022/0109544 A1    Apr. 7, 2022

Related U.S. Application Data

(63) Continuation of application No. 16/336,442, filed as application No. PCT/CN2018/083520 on Apr. 18, 2018, now Pat. No. 11,245,506.

(Continued)

(51) Int. Cl.
*H04L 5/00* (2006.01)
*H04W 72/0446* (2023.01)
(Continued)

(52) U.S. Cl.
CPC ......... *H04L 5/0053* (2013.01); *H04W 72/046* (2013.01); *H04W 72/0446* (2013.01); *H04W 72/0453* (2013.01); *H04W 72/23* (2023.01)

(58) Field of Classification Search
CPC ... H04L 5/0053; H04L 5/0023; H04L 1/0038; H04W 72/042; H04W 72/0446; H04W 72/0453; H04W 72/046; H04W 72/1289
See application file for complete search history.

(56) References Cited

U.S. PATENT DOCUMENTS

| 10,887,069 B2 | 1/2021 | Xu |
| 10,932,278 B2 | 2/2021 | Iyer et al. |

(Continued)

FOREIGN PATENT DOCUMENTS

| CN | 101578902 A | 11/2009 |
| CN | 102170703 A | 8/2011 |

(Continued)

OTHER PUBLICATIONS

Supplementary European Search Report in the European application No. 18793890.7, dated May 31, 2019.

(Continued)

*Primary Examiner* — Jay P Patel
(74) *Attorney, Agent, or Firm* — Ladas & Parry LLP

(57) ABSTRACT

A wireless navigation system with automatic guidance to the final destination routes capable of operating in Internet-dead zones includes a system of servers containing data of final destinations/routes, Google and, or Apple Maps API, a voice synthesizer server, a GPS/AGPS system of satellites, servers and processing stations, a set of sensors, a microprocessor, a standard mobile operating system, a supra operating system controlling the above systems and a display and sound system for displaying the final output of the system.

13 Claims, 7 Drawing Sheets

Related U.S. Application Data

(60) Provisional application No. 62/500,151, filed on May 2, 2017.

(51) Int. Cl.
  H04W 72/0453 (2023.01)
  H04W 72/044 (2023.01)
  H04W 72/23 (2023.01)

(56) References Cited

U.S. PATENT DOCUMENTS

| | | | |
|---|---|---|---|
| 11,071,170 B2* | 7/2021 | Xiong | H04L 5/0051 |
| 11,368,980 B2* | 6/2022 | Kwak | H04W 76/20 |
| 2013/0083706 A1 | 4/2013 | Lin | |
| 2014/0286297 A1 | 9/2014 | Zhao | |
| 2017/0041923 A1 | 2/2017 | Park | |
| 2017/0118792 A1 | 4/2017 | Rico Alvarino et al. | |
| 2017/0331577 A1 | 11/2017 | Parkvall et al. | |
| 2017/0331670 A1 | 11/2017 | Parkvall et al. | |
| 2017/0332359 A1 | 11/2017 | Tsai et al. | |
| 2017/0367046 A1* | 12/2017 | Papasakellariou | H04L 5/0053 |
| 2018/0049203 A1* | 2/2018 | Xue | H04L 5/0058 |
| 2018/0049236 A1* | 2/2018 | Sun | H04B 7/024 |
| 2018/0183491 A1 | 6/2018 | Takeda et al. | |
| 2018/0184410 A1 | 6/2018 | John Wilson et al. | |
| 2018/0192405 A1* | 7/2018 | Gong | H04L 5/0053 |
| 2018/0227156 A1 | 8/2018 | Papasakellariou | |
| 2018/0279135 A1* | 9/2018 | Hwang | H04W 72/23 |
| 2018/0288749 A1 | 10/2018 | Sun et al. | |
| 2018/0294911 A1 | 10/2018 | Sun et al. | |
| 2018/0309560 A1 | 10/2018 | Tang | |
| 2019/0103941 A1 | 4/2019 | Seo et al. | |
| 2019/0349915 A1 | 11/2019 | Ahn et al. | |
| 2019/0350049 A1 | 11/2019 | Miao et al. | |
| 2020/0007295 A1* | 1/2020 | Kwak | H04L 5/0053 |
| 2020/0008180 A1 | 1/2020 | Jo et al. | |
| 2020/0008181 A1 | 1/2020 | Hwang et al. | |
| 2020/0008216 A1 | 1/2020 | Iyer et al. | |
| 2020/0008231 A1 | 1/2020 | Vilaipornsawai et al. | |
| 2020/0021419 A1* | 1/2020 | Taherzadeh Boroujeni | H04L 5/0091 |
| 2020/0029312 A1 | 1/2020 | Falahati et al. | |
| 2020/0036497 A1 | 1/2020 | Xu | |
| 2020/0092946 A1* | 3/2020 | Xiong | H04L 5/0094 |
| 2020/0112355 A1 | 4/2020 | Park et al. | |
| 2020/0145079 A1 | 5/2020 | Marinier et al. | |
| 2020/0145950 A1* | 5/2020 | Harada | H04L 5/0082 |
| 2020/0229190 A1* | 7/2020 | Xue | H04W 72/042 |
| 2020/0288482 A1 | 9/2020 | Yi et al. | |
| 2020/0389917 A1 | 12/2020 | Kwak et al. | |
| 2022/0394686 A1* | 12/2022 | Xue | H04L 5/0094 |

FOREIGN PATENT DOCUMENTS

| | | |
|---|---|---|
| CN | 102395206 A | 3/2012 |
| CN | 103733705 A | 4/2014 |
| CN | 103931254 A | 7/2014 |
| RU | 2553983 C2 | 6/2015 |
| WO | 2014067146 A1 | 5/2014 |
| WO | 2017025484 A1 | 2/2017 |
| WO | 2018143777 A1 | 8/2018 |

OTHER PUBLICATIONS

Ericsson: "Summary of offline discussion on group common PDCCH", 3GPP Draft: R1-1701498, 3rd Generation Partnership Project (3GPP), Mobile Competence Centre ; 650, Route Des Lucioles ; F-06921 Sophia-Antipolis Cedex ; France, vol. RAN WG1 , No. Spokane, WA, USA; Jan. 16, 2017-Jan. 20, 2017 Jan. 20, 2017(Jan. 20, 2017), XP051222490, Retrieved from the Internet: URL: http://www.3gpp.org/ftp/tsg_ran/WG1_RL1/TSGR1_AH/NR_AH_1701/Docs/ [retrieved on Jan. 20, 2017].

Ericsson: "Summary of offline discussion on group common PDCCH—part 2", 3GPP Draft; R1-1701521, 3rd Generation Partnership Project (3GPP), Mobile Competence Centre ; 650, Route Des Lucioles ; F-06921 Sophia-Antipolis Cedex ; France, vol. RAN WG1 , No. Spokane, WA, USA; Jan. 16, 2017-Jan. 20, 2017 Jan. 22, 2017(Jan. 22, 2017), XP051222520, Retrieved from the Internet: URL: http://www.3gpp.org/ftp/tsg_ran/WG1_RL1/TSGR1_AH/NR_AH_1701/Docs/ [retrieved on Jan. 22, 2017].

Vivo: "Discussion on group common PDCCH and BD", 3GPP Draft; R1-1710391 Discussion on Group Common PDCCH and BD, 3rd Generation Partnership Project (3GPP), Mobile Competence Centre ; 650, Route Des Lucioles ; F-06921 Sophia-Antipolis Cedex ; France, vol. RAN WG1 , No. Qingdao, P.R. China; Jun. 27, 2017-Jun. 30, 2017 Jun. 17, 2017(Jun. 17, 2017), XP051304995, Retrieved from the Internet: URL: http://www.3gpp.org/ftp/tsg_ran/WG1_RL1/TSGR1_AH/NR_AH_1706/Docs/ [retrieved on Jun. 17, 2017].

Guangdong Oppo Mobile Telecom: "Impact on common channel reception to PDCCH design", 3GPP Draft; R1-1704616, 3rd Generation Partnership Project (3GPP), Mobile Competence Centre ; 650, Route Des Lucioles : F-06921 Sophia-Antipolis Cedex ; France, vol. RAN WG1 , No. Spokane, Washington, USA; Apr. 3, 2017-Apr. 7, 2017 Apr. 2, 2017(Apr. 2, 2017), XP051242755, Retrieved from the Internet: URL: http://www.3gpp.org/ftp/Meetings_3GPP_SYNC/RAN1/Docs/ [retrieved on Apr. 2, 2017].

First Office Action of the Vietnamese application No. 1-2019-06499, dated Aug. 31, 2022.

Third Office Action of the Canadian application No. 3061774, dated Sep. 22, 2022.

Second Office Action of the Australian application No. 2018262868, dated Aug. 30, 2022.

3GPP TSG RAN WG1 #88bis R1-1705386, Spokane, USA, Apr. 3-7, 2017, Agenda item: 8.1.3.1.6; Source: Samsung: Title: Configurations for NR-PDCCH Monitoring.

3GPP TSG RAN WG1 meeting #88bis R1-1704615, Spokane, Washington, USA Apr. 3-7, 2017, Source: Guangdong OPPO Mobile Telecom: Title: On NR PDCCH structure and CCE-REG mapping; Agenda Item: 8.1.3.1.2.

3GPP TSG RAN WG1#88 R1-1703049, Feb. 13-17, 2017, Athens, Greece, Agenda item: 8.1.3.1.2; Source: Motorola Mobility, Lenovo: Title: Further discussion on common control channel.

3GPP TS 36.211 V14.2.0 (Mar. 2017), 3rd Generation Partnership Project; Technical Specification Group Radio Access Network; Evolved Universal Terrestrial Radio Access (E-UTRA); Physical channels and modulation (Release 14).

3GPP TSG RAN WG1 Meeting #88bis R1-1704572, Spokane, USA, Apr. 3-7, 2017, Source: CATT: Title: Further details of group-common control; Agenda Item: 8.1.3.1.3.

3GPP TSG RAN WG1 Meeting #88bis R1-1704444, Spokane, USA, Apr. 3-7, 2017, Source: MediaTek Inc.; Title: Design of Search Space; Agenda Item: 8.1.3.1.4.

3GPP TSG RAN WG1 #88bis Meeting R1-1705516, Spokane, WA, USA, Apr. 3-8, 2017, Agenda Item: 8.1.3.1.2; Source: InterDigital Communications; Title: On NR-PDCCH Structure.

3GPP TSG RAN WG1 #88bis R1-1704950, Spokane, USA, Apr. 3-7, 2017, Source: ETRI: Title: Search space design for NR-PDCCH: Agenda Item: 8.1.3.1.4.

Notice of Objection of the European application No. 18793890.7, dated Apr. 26, 2021.

First Office Action of the European application No. 20176369.5, dated Oct. 20, 2021.

Second Office Action of the Canadian application No. 3061774, dated Nov. 18, 2021.

First Office Action of the U.S. Appl. No. 16/336,442, dated Jul. 1, 2020.

Second Office Action of the U.S. Appl. No. 16/336,442, dated Dec. 30, 2020.

Final Office Action of the U.S. Appl. No. 16/336,442, dated Jul. 2, 2021.

Notice of Allowance of the U.S. Appl. No. 16/336,442, dated Sep. 17, 2021.

Corrected Notice of Allowance of the U.S. Appl. No. 16/336,442, dated Oct. 12, 2021.

(56) References Cited

OTHER PUBLICATIONS

First Office Action of the Chinese application No. 202010227111.1, dated May 17, 2022.
First Office Action of the Israeli application No. 270340, dated Mar. 20, 2022.
U.S. Appl. No. 62/500,151, filed May 2, 2017.
First Office Action of the Chinese application No. 201880003116.7, dated Nov. 27. 2019.
European Search Report in the European application No. 20176369.5, dated Aug. 27, 2020.
Huawei et al: "Search space design considerations", 3GPP Draft; R1-1704202, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Mar. 25, 2017 (Mar. 25, 2017), XP051251011, Retrieved from the Internet: URL: http://www.3gpp.org/ftp/tsg_ran/WG1_RL1/TSGR1_88b/Docs/ [ retrieved on Mar. 25, 2017].
Huawei et al: "Discussion on NR-PDCCH structure", 3GPP Draft; R1-1704204, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Mar. 25, 2017 (Mar. 25, 2017), XP051251013, Retrieved from the Internet: URL: http://www.3gpp.org/ftp/tsg_ran/WG1_RL1/TSGR1_88b/Docs/ [ retrieved on Mar. 25, 2017].
Office Action of the Indian application No. 201917048883, dated Mar. 17, 2021.
First Office Action of the Russian application No. 2019138596, dated Apr. 29, 2021.
Second Office Action of the Chilean application No. 201903132, dated Apr. 20, 2021.
First Office Action of the Chilean application No. 201903132, dated Dec. 17. 2020.
First Office Action of the Canadian application No. 3061774, dated Feb. 3, 2021.
International Search Report in international application No. PCT/CN2018/083520, dated Jul. 16, 2018.
Written Opinion of the International Search Authority in international application No. PCT/CN2018/083520, dated Jul. 16, 2018.
Guangdong OPPO Mobile Telecom. "PDCCH CORESET configuration and UE procedure on NR-PDCCH." 3GPP TSG RAN WG1 meeting #89, R1-1707703., May 6, 2017 (May 6, 2017), sections 1-3.
Guangdong OPPO Mobile Telecom. "PDCCH Coreset configuration and UE procedure on NR-PDCCH." 3GPP TSGRAN WG1 NRAd-Hoc#2, R1-1710150., Jun. 16, 2017 (Jun. 16, 2017), sections 1-3.
Guangdong OPPO Mobile Telecom. "Some remaining issues on CORESET configuration." 3GPP TSG RAN WG1 Meeting #90, R1-1713259., Aug. 11, 2017 (Aug. 11, 2017), sections 1-5.
Vivo, Samsung, ZTE, ZTE Microelectronics, Interdigital. "WF on blind decoding on 1-56 CORESET." 3GPP TSG RAN WG1 88bis Meeting, R1-1706692., Apr. 9, 2017 (Apr. 9, 2017), pp. 2-4.
Samsung, Multiplexing between data and control [online], 3GPP TSG RAN WG1#88b R1-1705384, Internet<URL: http://www.3gpp.org/ftp/tsg_ran/WG1_R L1/TSGR1_88b/Docs/R1-1705384.zip>, Mar. 24, 2017.
Samsung, Resource mapping aspects for NR-PDCCH [online], 3GPP TSG RAN WG1#88b R1-1705376, Internet<URL: http://www.3gpp.org/ftp/tsg_ran/WG1_R L1/TSGR1_88b/Docs/R1-1705376.zip>, Mar. 24, 2017.
First Office Action of the Japanese application No. 2019-569353, dated Jan. 7, 2022.
Office Action of the Australian application No. 2018262868, dated Mar. 30, 2022.
First Office Action of the Mexican application No. MX/a/2019/013073, dated Nov. 24, 2022.

* cited by examiner

METHODS AND APPARATUSES FOR DETECTING CONTROL CHANNELS IN WIRELESS COMMUNICATION SYSTEMS

CROSS-REFERENCE TO RELATED APPLICATIONS

The present application is a continuation of U.S. application Ser. No. 16/336,442, filed on Mar. 25, 2019, which is an application under 35 U.S.C. 371 of International Application No. PCT/CN2018/083520, filed on Apr. 18, 2018, which claims the benefit of priority to U.S. Provisional Application No. 62/500,151, filed on May 2, 2017, the entire contents of each of which are incorporated herein by reference.

TECHNICAL FIELD

The present application relates to communication systems, and more particularly, to methods and apparatuses for detecting control channels in wireless communication systems.

BACKGROUND

In a long term evolution (LTE) system, a control region spanning over several orthogonal frequency-division multiplexing (OFDM) symbols and several frequency subcarriers may be allocated for transmission of a physical downlink control channel (PDCCH). A resource element is defined as the smallest resource structure, covering one subcarrier over one OFDM symbol. Multiple resource elements form a resource element group (REG). PDCCH is carried by one or multiple control channel elements (CCE), each consisting of a number of REGs, depending on the size of payload and channel quality. The REGs of different PDCCHs may be interleaved and spread across the whole control region to achieve time and frequency gain. Because a user equipment (UE) may not know which REGs carry PDCCH information intended for it, the UE may need to blindly decode possible REGs to receive the UE's PDCCH before receiving the UE's user data in the same subframe. Blind decoding is highly complicated and requires a large amount of calculation.

In a new radio system, such as the fifth generation (5G) new radio system, a similar channel structure may be used for PDCCH. A new radio system may be deployed at a higher frequency (e.g., above 6 GHz), at which wide bandwidths are available. Some new techniques, such as beamforming (BF), could be adopted in the new radio system. A PDCCH in a new radio system may likewise consist of CCEs, each CCE including a set of REGs. But mapping CCE or REG to the control region of time and frequency for PDCCH may become challenging. For example, analog BF may require all the REGs of a PDCCH transmitted by one beam to be on one OFDM symbol and those transmitted by different beams be on different OFDM symbols. These new techniques require flexible PDCCH time duration and mapping between CCEs, REGs, and PDCCH to reduce a UE's PDCCH blind decoding complexity.

SUMMARY

In some aspects, the present application is directed to a method for a wireless. communication device to detect a control channel. The method may include obtaining a time duration of a control region. The method may also include determining Whether a first control resource set is within the time duration. In response to a determination that the first control resource set is within the time duration, the method may further include detecting a control channel in the first control resource set.

In some aspects, the present application is directed to a method for a wireless communication apparatus. The method may include transmitting a time duration of a control region. The method may also include determining whether a first control resource set is within the time duration. In response to a determination that the first control resource set is within the time duration, the method may whether include transmitting a control channel in the first control resource set.

In some aspects, the present application is also directed to a user device. The user device may include a memory storing instructions. The user device may also include a processor communicatively coupled to the memory. The instructions, when executed by the processor, may cause the processor to perform operations including obtaining a time duration of a control region. The instructions, when executed by the processor, may also cause the processor to perform the operations including determining whether a first control resource set is within the time duration. In response to a determination that the first control resource set is within the time duration, the instructions, when executed by the processor, may further cause the processor to perform the operations including detecting a control channel in the first control resource set.

In some aspects, the present application is also directed to a network apparatus, The network apparatus may include a memory storing instructions. The network apparatus may also include a processor communicatively coupled to the memory. The instructions, when executed by the processor, may cause the processor to perform operations including transmitting a time duration of a control region. The instructions, when executed by the processor, may also cause the processor to perform the operations including determining whether a first control resource set is within the time duration. In response to a determination that the first control resource set is within the time duration, the instructions, when executed by the processor, may further cause the processor to perform operations including transmitting a control channel in the first control resource set.

In some aspects, the present application is also directed to a non-transitory computer-readable medium storing instructions that are executable by one or more processors of an apparatus to perform a method for a wireless communication device. The method may include obtaining a time duration of a control region. The method may also include determining whether a first control resource set is within the time duration. In response to a determination that the first control resource set is within the time duration, the method may further include detecting a control channel in the first control resource set.

In some aspects, the present application is also directed to a non-transitory computer-readable medium storing instructions that are executable by one or More processors of an apparatus to perform a method for a wireless communication apparatus. The method may include transmitting a time duration of a control region. The method may also include determining whether a first control resource set is within the time duration. In response to a determination that the first control resource set is within the time duration, the method may further include transmitting a control channel in the first control resource set.

DETAILED DESCRIPTION

Reference will now be made in detail to exemplary embodiments, examples of which are illustrated in the accompanying drawings. The following description refers to the accompanying drawings in Which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
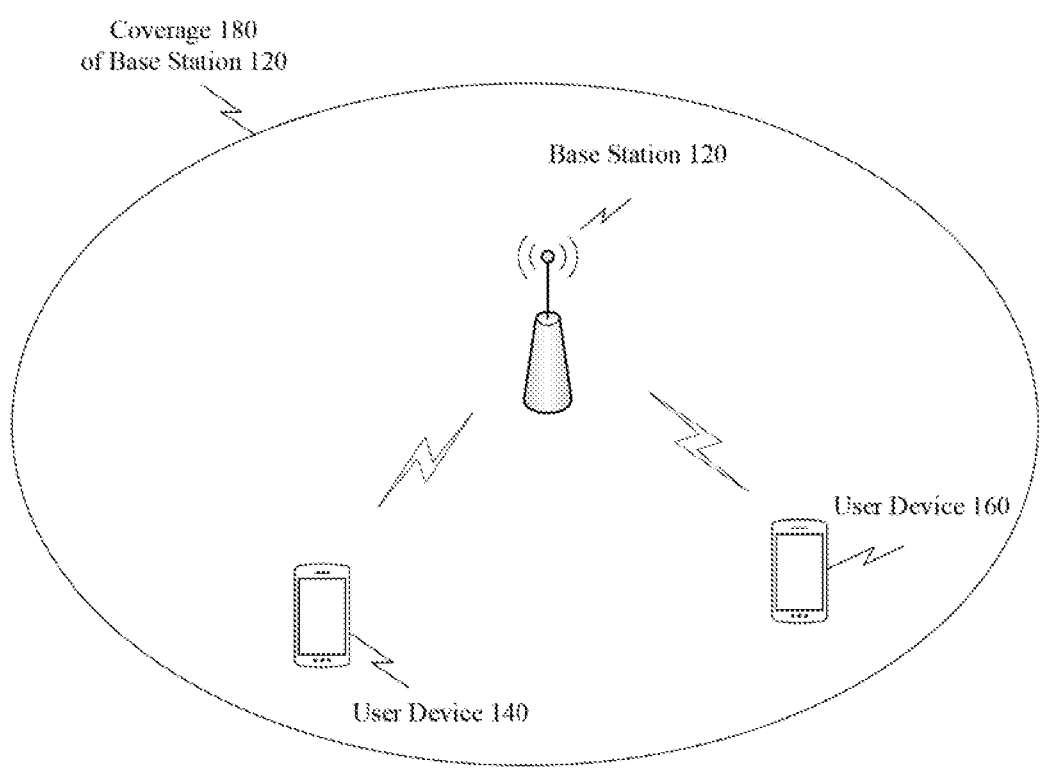
FIG. 1 illustrates an exemplary scenario of a wireless communication system, according to some embodiments of the present application.

FIG. 1 illustrates an exemplary scenario of a wireless communication system, consistent with embodiments of the present application. The wireless communication system may include a base station 120, a user device 140, and another user device 160. Base station 120 is an end node of a wireless communication network. For example, base station 120 may be an evolved node B (eNB) in an LTE system or a gNB in a 5G new radio system. Base station 120 may transmit radio signals carrying system information of the wireless communication system A user device within a coverage 180 around base station 120 may receive the system information. For example, user device 140 within coverage 180 may receive the system information, and may access network services through base station 120.

User device 140 is a mobile terminal in the wireless communication network. For example, user device 140 may be a smart phone, a network interface card, or a machine type terminal. As another example, user device 140 may be a user equipment (UE) in the LTE system or the 5G new radio system. Both user device 140 and base station 120 contain communication units that can transmit and receive radio signals.

When user device 140 intends to access network services through base station 120, user device 140 may need to receive control signals front base station 120 to collect system information with coverage 180, such as synchronization and radio resource allocation and schedule. For example, user device 140 in the 5G new radio system may need to receive a PDCCH to learn whether any data in a physical downlink shared channel is transmitted to user device 140. Accordingly, user device 140 needs to detect a PDCCH among signals transmitted by base station 120.

Figure 2:
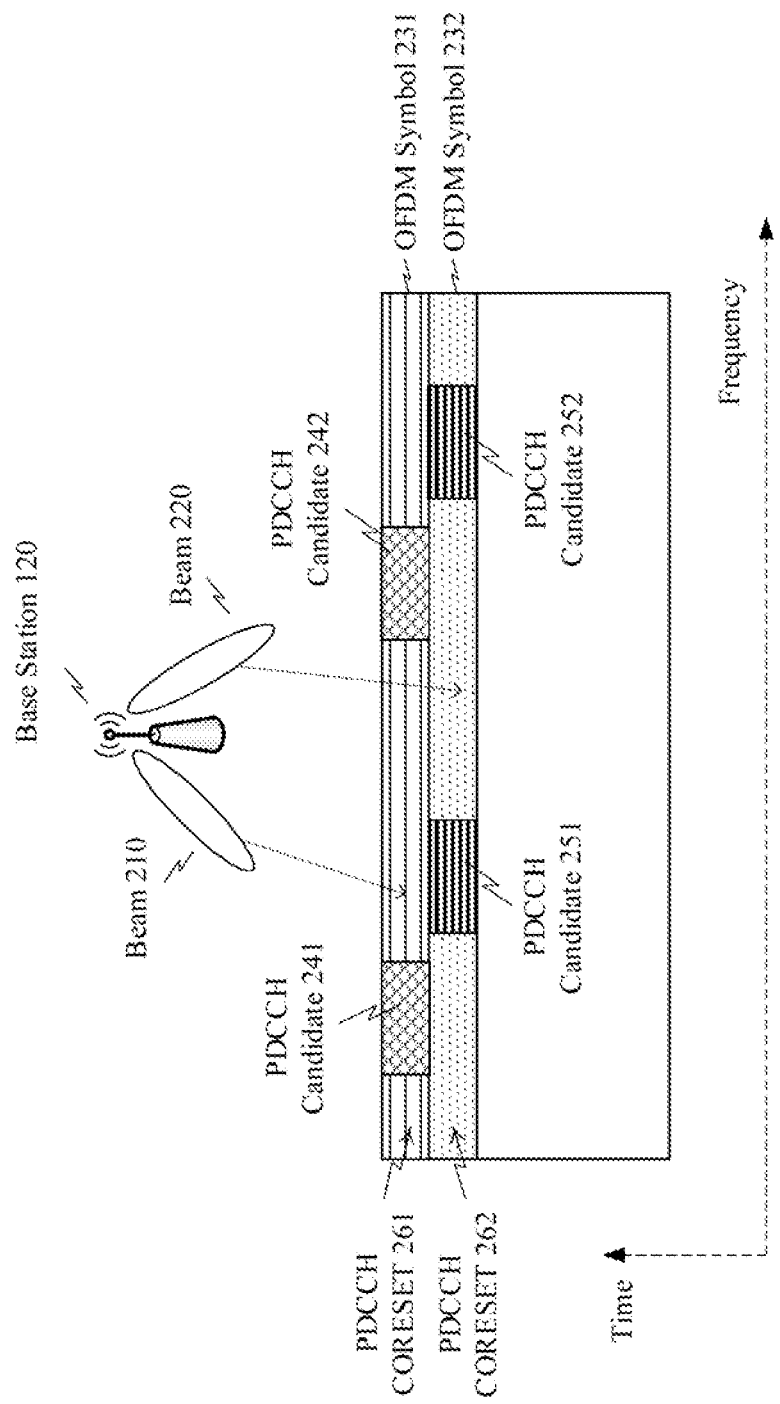
FIG. 2 is a schematic diagram of an exemplary control channel configuration in a wireless communication system, according to some embodiments of the present application.

FIG. 2 is a schematic diagram an exemplary control channel configuration in a wireless communication system, consistent with embodiments of the present application. A 5G new radio system, for example, uses OFDM waveform for the wireless communications. As in existing LTE cellular networks, communications are measured in time frames, each frame is divided into slots, and each slot may contain multiple OFDM symbols each spanning over the multiple frequency subcarriers. Resources are defined in time (OFDM symbols) and frequency (subcarriers).

A PDCCH search space is a set of resources that a user device, e.g., 140, may assume carrying its PDCCH candidates and attempt to search and decode to obtain control information. Without loss of generality, for a user device, the instances of resources where PDCCHs are configured to be transmitted (or the instances that the user device is configured to monitor its PDCCH) are called scheduling tor PDCCH) instances hereinafter. User device 140 may conduct blind decoding of all the PDCCH instances in its search space until it successfully decodes its PDCCH candidate. Once PDCCH is successfully decoded, user device 140 proceeds to receive and decode data transmitted from the base station on a data channel such as physical downlink shared channel (PDSCH). If, user device 140 fails to decode a PDCCH in its search space, user device 140 may assume no PDCCH is transmitted at that scheduling instance and may not decode its PDSCH.

PDCCHs can be transmitted in a flexible manner, with the CORESETs configured at a symbol level, a slot level, or a multi-slot level. Consistent with embodiments of the present disclosure, a control resource set (CORESET) may be defined as the user device 140's PDCCH search space may be located and may be user-device specific, and may differ from user device to user device. For example, as shown in FIG. 2, base station 120 may use two beams 210 and 320 in the system to transmit PDCCH. Each beam may carry a different OFDM symbol. For example, beam 210 carries OFDM symbol 231, and beam 220 carries OFDM symbol 232. Accordingly, base station 120 may configure PDCCH CORESET 261 on OFDM symbol 231 for the user device receiving beam 210 and PDCCH CORESET 262 on OFDM symbol 232 for the user device receiving beam 220. PDCCH CORESET 261 may include PDCCH candidates 241 and 242. PDCCH CORESET 262 may include PDCCH candidates 251 and 252. The user devices receiving beams 210 and 220 will attempt to decode PDCCH candidates 241/242 and 251/252, respectively.

Figure 3:
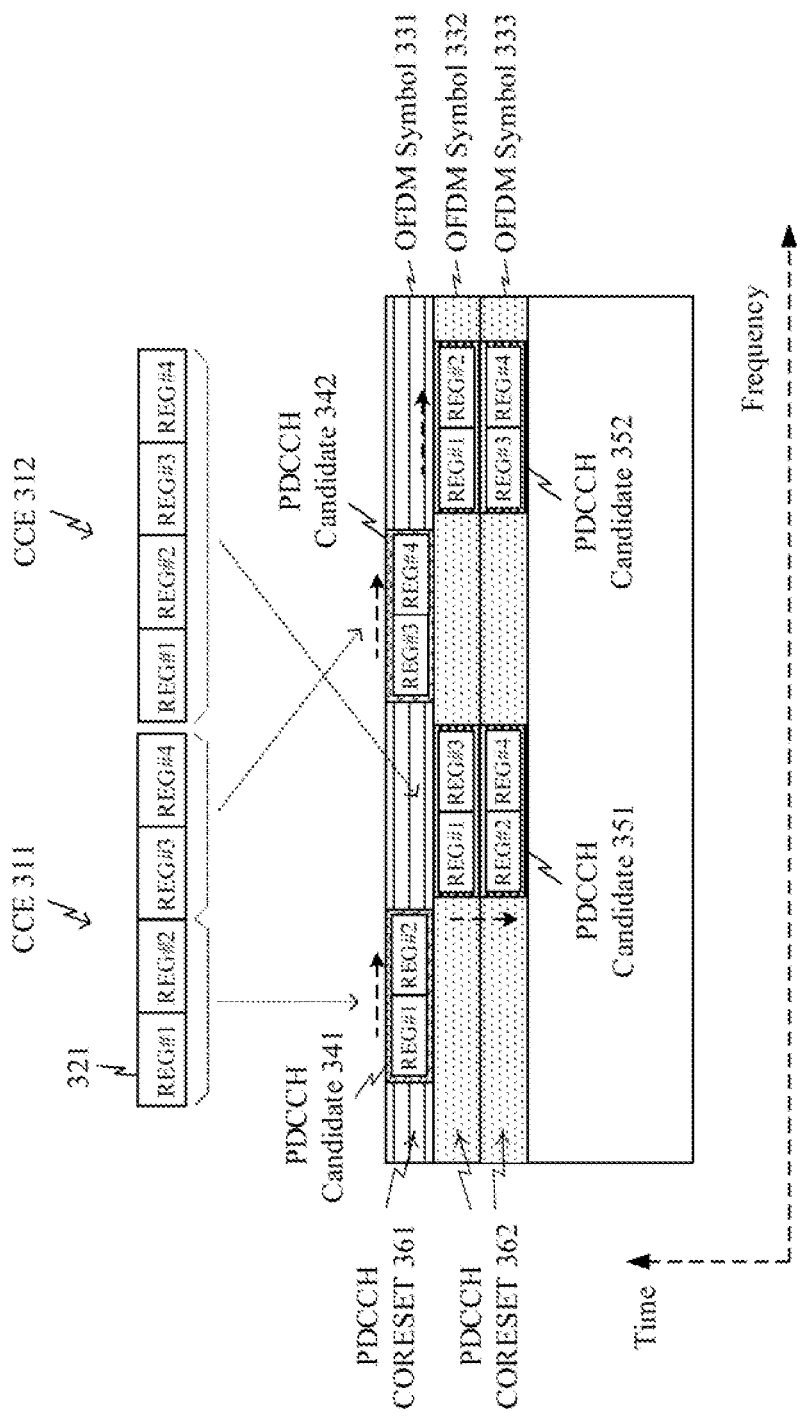
FIG. 3 is a schematic diagram of an exemplary control channel configuration in a wireless communication system, according to some embodiments of the present application.

FIG. 3 is a schematic diagram of an exemplary control channel configuration in a wireless communication system, consistent with embodiments of the present application. As shown in the figure, base station 120 may configure two CORESETs, PDCCH CORESET 361 on one OFDM symbol 331 and PDCCH CORESET 362 on two OFDM symbols 332 and 333. PDCCH CORESET 361 includes a PDCCH candidate 341. PDCCH CORESET 362 includes two PDCCH CORESETs 351 and 351.

A CORESET may include multiple CCEs (and therefore multiple REGs). For example, in FIG. 3, PDCCH CORESET 362 may include PDCCH candidates 351 and 352. PDCCH candidate 351 may be used to carry CCE 312, and PDCCH candidate 352 may be used to carry another CCE. Thus, PDCCH CORESET 362 may include at least 2 CCEs, where PDCCH candidate 351 may include 4 REGs and PDCCH candidate 352 may include another 4 REGs. Therefore, PDCCH CORESET 362 may include at least 8 REGs. PDCCH search space may be located on PDCCH candidate 351, PDCCH candidate 352, or both.

With PDCCH CORSET 362 occupying two OFDM symbols, base station 120 may configure CORESETs with a time-first CCE-to-REG mapping, such that each CCE is mapped to REGs starting in the time domain (i.e., across the multiple OFDM symbols) and then in the frequency domain i.e., across subcarriers) if available. As shown in FIG. 3, PDCCH candidate 351 is mapped in time domain first, and then in the frequency domain. REG#1, #2, #3, and #4 of CCE 312 are mapped to the four REGs of PDCCH candidate 351 across OFDM symbols 332 and 333 first and then to next positions in the frequency domain.

Alternatively, base station 120 may configure CORESET with a frequency-first CCE-to-REG mapping, such that each CCE is mapped to REGs starting in the frequency domain (i.e., across subcarriers) and then in the time domain (i.e., across OFDM symbols) if available. As shown in FIG. 3, PDCCH candidate 352 is mapped in time domain first, and then in the frequency domain.

FIGS. 2 and 3 show that a user device is configured with one CORESET by the base station. Alternatively, a user device may be configured with multiple PDCCH CORESETs. As an example, in FIG. 4, which shows a schematic diagram of another exemplary control channel configuration, base station 120 configures one PDCCH CORESET 462 for user device 160 on OFDM symbol 432, but may configure two PDCCH CORESETs, 461 and 463, for user device 140 on OFDM symbols 431 and 433.

The base station may also configure CORESETs dynamically or semi-statically. For example, when the capacity of a user device is low, the base station may configure only one CORESET; otherwise the base station may configure multiple CORESETs for the user device. Even though multiple CORESETs on multiple OFDM symbols may be configured, not all CORESETs necessarily have to be used to transmit PDCCH. For example, the base station may configure 3 CORESETs, as in FIG. 4, for PDCCH transmission for all user devices in a cell. In some PDCCH scheduling instances, PDCCH CORESET 463 may not be used due to either capacity or other scheduling, consideration, and only PDCCH CORESET 461 and 462 (i.e., OFDM symbols 431 and 432) are used. Not knowing exactly which CORESETs are used, a user device may need to monitor the PDCCH control region and try to blind decode PDCCH candidates in all configured CORESETs. Alternatively, the base station may inform the user devices the instant PDCCH time duration, i.e., the duration of PDCCH transmission, such that the user device knows which PDCCH candidates to decode and blind decoding is unnecessary.

Figure 4:
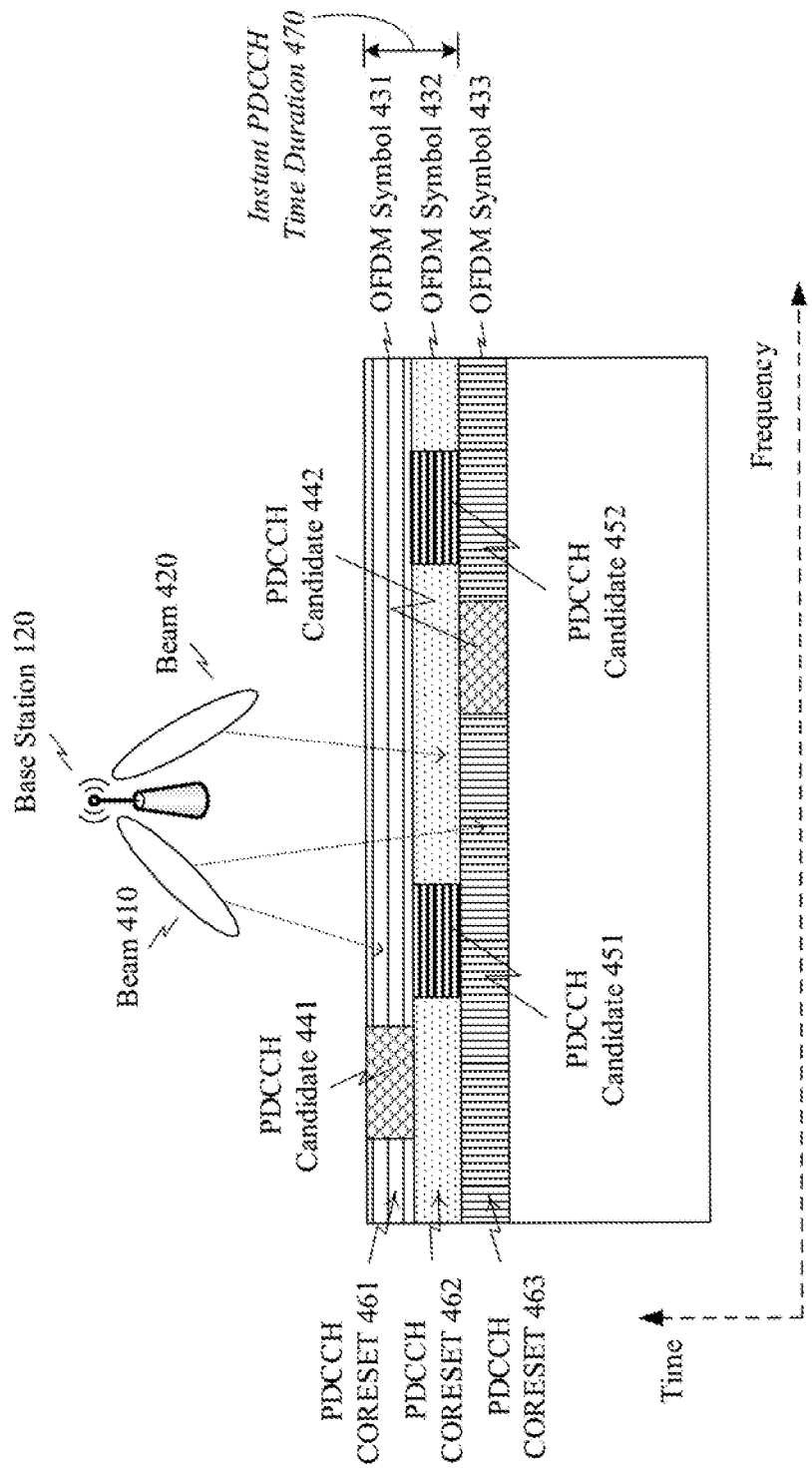
FIG. 4 is a schematic diagram of an exemplary control channel configuration in a wireless communication system according to some embodiments of the present application.

The instant PDCCH time duration is the total number of OFDM symbols used for PDCCH transmission. In other words, it is a combination of time duration of all CORESETs (not the configured ones) that are actually used by the base station for a PDCCH scheduling instance. For example, if all three OFDM symbols, i.e. PDCCH CORESETs 461, 462, and 463 shown in FIG. 4, are used for PDCCH transmissions at a particular PDCCH scheduling instance, the instant number of OFDM symbols (or PDCCH time duration) is 3; if only the first two OFDM symbols, i.e. PDCCH CORESETs 461 and 462 shown in FIG. 4, are used for PDCCH transmissions, the instant total number of OFDM symbols (or PDCCH time duration) is 2.

In some embodiments, base station 120 may signal this instant PDCCH time duration to all the user devices that are supposed to decode their PDCCHs at a scheduling instance. In some embodiments, base station 120 may dynamically send the PDCCH time duration prior to each scheduling instance on a common control channel. Alternatively, base station 120 may send the instant PDCCH time duration to all the user devices periodically over a certain time duration on a common control channel. In some embodiments, the base station may semi-statically send to the user devices by higher layer signaling. In the latter two cases, those user devices may assume the number of OFDM symbols that carry PDCCH does not change over the time duration before they receive the next signal.

In some embodiments, if a user device does not receive the PDCCH time duration from the base station, or if the received information may be inaccurate or outdated, it may choose to search for its PDCCH candidates over all the CORESETs that are configured for the user device.

In some embodiments, base station 120 may signal an instant PDCCH time duration to a group of user devices. For example, base station 120 may transmit a group's instant PDCCH time duration as described above. Those user devices in the group may receive the groups instant PDCCH time duration as described above. In some embodiments, if a user device in the group does not receive the PDCCH time duration from the base station, or if the received information may be inaccurate or outdated, it may choose to search for its PDCCH candidates over all the CORESETs that are configured for the user device.

In some embodiments, base station 120 may signal an instant PDCCH time duration to a user device. For example, base station 120 may transmit an instant PDCCH time duration dedicated to a user device. The user device may receive its instant PDCCH time duration. In some embodiments, if the user device does not receive its PDCCH time duration from the base station, or if the received information may be inaccurate or outdated, it may choose to search for its PDCCH candidates over all the CORESETs that are configured for the user device.

Base station 120 may also signal the PDCCH configuration, including frequency allocation and time duration of the CORESETs and PDCCH candidates, to user devices via higher layer signals in a semi-static manner. Each CORESET may contain the CCEs that are the user device's PDCCH candidates and may be a search space for a riser device. The search space of the user device (CCEs that may carry its PDCCH candidates) may be determined by implicit/explicit manner. The user device may blind decode its PDCCH candidates in its search space in each CORESET. Alternatively, the number of PDCCH candidates as well as their CCE aggregation. levels in each search space may be configured and signaled to the user device explicitly. A CCE aggregation level is a number of CCEs that a PDCCH is transmitted on. A base station may transmit different PDCCHs in different CCE aggregation levels, such as 1, 2, 4, and 8 CCEs. For example, base station 120 may transmit one PDCCH by CCE 311 in FIG. 3 if the aggregation level is 1. If the aggregation level is 2, base station 120 may transmit one PDCCH by both CCEs 311 and 312. The CCE aggregation levels may be determined according to, for example, channel conditions, modulation schemes, and payload sizes of PDCCHs.

Accordingly, a user device may only need to detect PDCCH on those PDCCH CORESETs within the time duration of the control region. The user device may not detect the other configured PDCCH CORESETs that are not within the instant PDCCH time duration. In other words, the user device may only need to search on a reduced number of CCEs. As a result, the complex blind detection of PDCCH is avoided or reduced.

Figure 5:
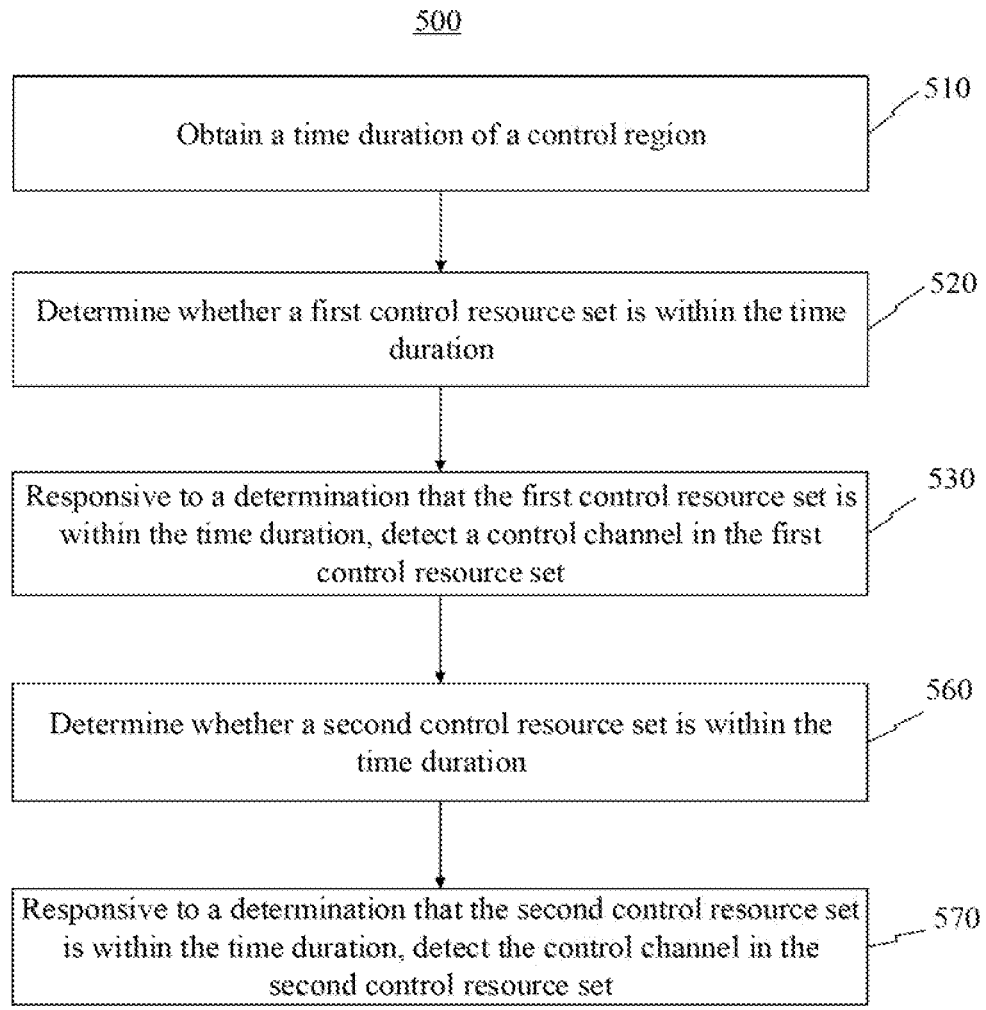
FIG. 5 is as schematic diagram of an exemplary method for detecting a control channel in a wireless communication system, according to some embodiments of the present application.

FIG. 5 is a schematic diagram of an exemplary method 500 for detecting a control channel in a wireless communication system, consistent with embodiments of the present application. Method 500 includes obtaining a time duration of a control region (step 510), determining whether a first control resource set is within the time duration (step 520), and responsive to a determination that the first control resource set is within the time duration, detecting a control channel in the first control resource set (step 530). In some embodiments, method 500 may also include determining whether a second control resource set is within the time duration (step 560), and responsive to a determination that the second control resource set is within the time duration, detecting the control channel in the second control resource set (step 570).

Step 510 includes obtaining a time duration of a control region. For example, user device 140 may receive the time duration, i.e., the number of OFDM symbols for PDCCH transmission, from base station 120. User device 140 may obtain the time duration of the control region intended for user device 140 in step 510. For example, user device 140 may receive instant PDCCH time duration 470 in FIG. 4 from its previous PDCCHs periodically. Alternative user device 140 may obtain the time duration of the control region from a broadcast system information. For example, user device 140 may receive instant PDCCH time duration 470 from a broadcast channel transmitted by base station 120.

Step 520 includes determining whether a control resource set is within the time duration. For example, user device 140 may obtain instant PDCCH time duration 470 in FIG. 4 as 2 symbols. When user device 140 is configured with PDCCH CORESET 462 in FIG. 4, user device 140 may determine its PDCCH CORESET 462 is within instant PDCCH duration 470.

Step 530 includes responsive to a determination that the control resource set is within the time duration, detecting a control channel in the first control resource set. For example, user device 140 may determine its configured PDCCH CORESET 462 is within instant PDCCH duration 470 in step 520. In response to the determination that its PDCCH CORESET 462 is within instant PDCCH time duration 470, user device 140 may detect its PDCCH on PDCCH candidates 451 and 452.

Step 560 includes determining whether another control resource set is within the time duration. For example, user device 140 may obtain an instant PDCCH time duration as 3 symbols when user device 140 is configured with PDCCH CORESETs 461 and 463. After determining PDCCH CORESET 461 is within the instant PDCCH time duration, user device 140 may determine that PDCCH CORESET 463 is also within the instant PDCCH time duration in step 560.

Step 570 includes responsive to a determination that the another control resource set is within the time duration, detecting the control channel in the another control resource set. For example, user device 140 may determine its PDCCH CORESET 463 is within the instant PDCCH time duration alter determining PDCCH CORESET 461 is within the instant PDCCH time duration. In response to the determination that its second configured PDCCH CORESET 463 is within the instant PDCCH time duration, user device 140 may detect its PDCCH an PDCCH candidates 442 on OFDM symbol 433 in step 570.

In some embodiments, method 500 may include responsive to a determination. that the control resource set is not within the time duration, not detecting the control channel in the first control resource set. For example, user device 160 may obtain an instant PDCCH time duration as 1 symbol when user device 160 is configured with PDCCH CORESET 462. In response to a determination that PDCCH CORESET 462 is not within the instant PDCCH time duration, user device 160 may not detect its PDCCH on PDCCH candidates 451 and 452 in PDCCH CORESET 462.

In some embodiments, method 500 may include responsive to a determination. that the control resource set is partially within the time duration, detecting the control channel in the first control resource set. For example, user device 160 may obtain an instant PDCCH time duration as 1 symbol when user device 160 is configured with a PDCCH CORESET on both OFDM symbol 431 and 432. In response to a determination that the PDCCH CORESET is partially within the instant PDCCH time duration, user device 160 may detect PDCCHs in the PDCCH CORESET.

In some embodiments, method 500 may include responsive to a determination. that the control resource set is partially within the time duration, not detecting the control channel in the first control resource set. For example, user device 160 may obtain an instant PDCCH time duration as 1 symbol when user device 160 is configured with a PDCCH CORESET on both OFDM symbol 431 and 432. In response to a determination that the PDCCH CORESET is partially within the instant PDCCH time duration, user device 160 may not detect PDCCHs in the configured. PDCCH CORESET.

In some embodiments, obtaining the time duration of the control region in step 510 may include receiving the time duration of the control region in the first symbol of a time slot or a scheduling instant. For example, when OFDM symbol 431 in FIG. 4 is the first symbol of a time slot or a scheduling instant, user device 140 may receive instant PDCCH duration 470 in OFDM symbol 431.

In some embodiments, obtaining the time duration of the control region in step 510 may include receiving the time duration of the control region periodically. For example, user device 140 may periodically receive an update of instant PDCCH time duration 470 from base station 120 every 100 milliseconds (ms).

In some embodiments, obtaining the time duration of the control region in step 510 may include receiving the time duration of the control region semi-statically. For example, user device 140 may receive instant PDCCH time duration 470 semi-statically transmitted by base station 120. Base station 120 may transmit, for example, a radio resource control (RRC) configuration signal including, the instant PDCCH time duration when an update of the instant PDCCH time duration is needed. Accordingly, user device 140 may receive an updated instant PDCCH time duration through the RRC configuration signal. Before receiving another updated one, user device 140 may continue to use the current one as its instant PDCCH time duration.

In some embodiments, obtaining the time duration of the control region in step 510 may include obtaining the time duration of the control region based on a default time duration. For example, user device 140 may presume a default instant PDCCH time duration to be 3 OFDM symbols. Before each scheduling instant, user device 140 may use the default instant PDCCH time duration to compare with its configured PDCCH CORESETs. In some embodiments, user device 140 may obtain a default instant PDCCH time duration according to its system bandwidth or frequencies. For example, if user device 140 supports only 20 MHz or below, user device 140 may use 3 OFDM symbols as its default instant PDCCH time duration.

In some embodiments, obtaining the time duration of the control region in step 510 may include obtaining the time duration of the control region by using a previous time duration. For example, user device 140 may receive an instant PDCCH time duration in the lust OFDM symbol of each time slot. When user device 140 does not receive any instant PDCCH time duration in the first OFDM symbol of a certain time slot, use device 140 may reuse the previous instant PDCCH time duration.

In some embodiments, obtaining the time duration of the control region in step 510 may include obtaining the time duration of the control region based on a whole control region of a cell. For example, when base station 120 signals multiple PDCCH CORESETs for user devices, user device 140 may presume that the instant PDCCH time duration includes OFDM symbols covering all the PDCCH CORESETs signaled by base station 120.

In some embodiments, the control resource set may be configured on one or more symbols. For example, as shown in FIG. 3, base station 120 may configure PDCCH CORESET 362 on two OFDM symbols 332 and 333.

In some embodiments, a first control resource set is configured on one or more symbols, and a second control resource set is configured on one or more symbols which could be different from those configured for the first control resource set. For example, as shown in FIG. 3, base station 120 may respectively configure PDCCH CORESET 361 on OFDM symbol 331, and PDCCH CORESET 362 on symbol 332 and 333. OFDM symbol 331 is not overlapped with OFDM symbols 332 and 333.

In some embodiments, a first control resource set and a second control resource set may be configured on at least a common symbol. For example, base station 120 may configure a PDCCH CORESET on OFDM two symbols #1 and #2, and another PDCCH CORESET on two OFDM symbols #2 and #3. Thus, the two PDCCH CORESETs are configured on a common OFDM symbol #2.

In some embodiments, the first control resource set may be transmitted in a first beam, and the second control resource set may be transmitted in a second beam. For example, base station 120 in FIG. 4 may respectively transmit a PDCCH on PDCCH CORESET 461 in beam 410, and another PDCCH on PDCCH CORESET 462 in beam 220.

In some embodiments, the first control resource set may include a plurality of resource elements (REs), and the control channel is transmitted on at least a part of REs according to a frequency-first mapping, a time-first mapping, or a combination thereof. In FIG. 3, for example, base station 120 may configure PDCCH CORESET 362 including PDCCH candidates 351 and 352. PDCCH candidates 351 and 352 each include four REGs, and therefore include a plurality of REs. In other words, PDCCH CORESET 362 may include a plurality of REs.

When base station 120 transmits a PDCCH on, for example, PDCCH candidate 351, the four REGs #1, #2, #3, and #4 of PDCCH candidate 351 are used to carry the PDCCH according to a time first mapping. As shown in FIG. 3, REG #1 and #2 of PDCCH candidate 351 are mapped across OFDM symbols 332 and 333 first and then REG #3 and #4 of PDCCH 351 are mapped, i.e., the time-first mapping.

Alternatively, base station 120 may transmit a PDCCH on, for example, PDCCH candidate 352, the four REGs #1, #2, #3, and #4 of PDCCH candidate 352 are used to carry the PDCCH according to a frequency-first mapping. As shown in FIG. 3, REG #1 and #2 of PDCCH candidate 352 are first mapped to across subcarriers in the frequency domain on OFDM symbol 332, and then, across to OFDM symbol 333, REG #3 and #4 of PDCCH 352 are mapped, i.e., the frequency-first mapping.

In another example, base station 120 may transmit a PDCCH on both PDCCH candidates 351 and 352. According to the time-first and the frequency-first mappings described in the above two examples on PDCCH candidates 351 and 352, the PDCCH transmitted on both PDCCH candidates 351 and 352 are transmitted according to a combination of the time-first and the frequency-first mappings.

In some embodiments, detecting a control channel in step 530 may include detecting on which part of REs the control channel is transmitted. For example, when user device 160 is configured with PDCCH CORESET 462, base station 120 may transmit a PDCCH on either PDCCH candidate 451 or 452. User device 160 may detect its PDCCH on REGs of PDCCH candidate 451 or REGs of PDCCH candidate 452.

Figure 6:
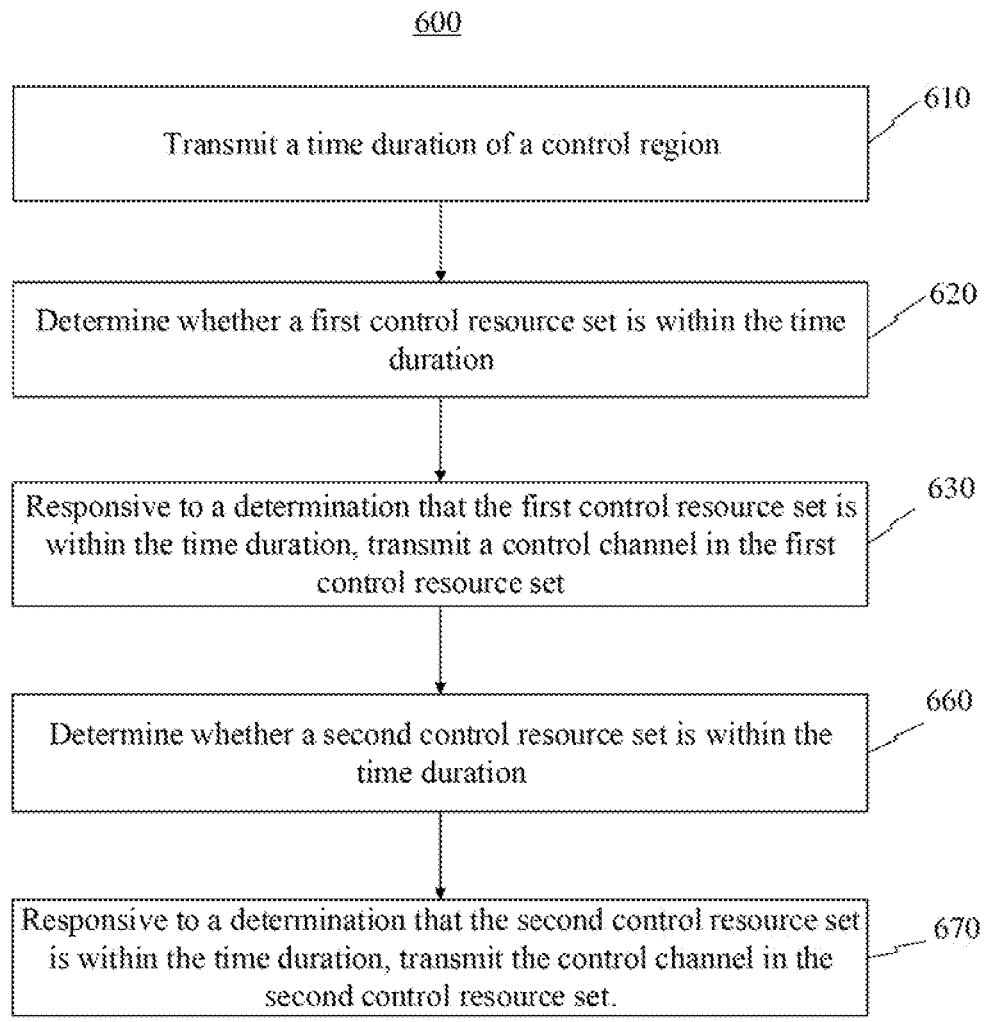
FIG. 6 is a schematic diagram of an exemplary network apparatus for transmitting a control channel in a wireless communication system, according to some embodiments of the present application.

FIG. 6 is a schematic diagram of an exemplary method 600 for transmitting a control channel in a wireless communication system, according to some embodiments of the present application. Method 600 includes transmitting a time duration of a control region (step 610), determining whether a first control resource set is within the time duration (step 620), and responsive to a determination that the first control resource set is within the time duration, transmitting a control channel in the first control resource set (step 630). In some embodiments, method 600 may also include determining whether a second control resource set is within the time duration (step 660), and responsive to a determination that the second control resource set is within the time duration, transmitting the control channel in the second control resource set (step 670).

Step 610 includes transmitting a time duration of a control region. Base station 120 may transmit the time duration of the control region for all user devices, a group of user devices, or a user device in coverage 180. For example, base station 120 may transmit instant PDCCH time duration 470 in FIG. 4 in user device 140's PDCCHs periodically.

Alternatively, base station 120 may broadcast system information including the time duration of the control region for all user device in coverage 180. For example, base station 120 may transmit instant PDCCH time duration 470 in a broadcast channel (BCH).

Step 620 includes determining whether a first control resource set is within the time duration. For example, base station 120 may transmit instant PDCCH time duration 470 as 2 symbols for all user devices, a group of user devices, or a user device. Base station 120 in any of these configurations may know that user device 140 has an instant PDCCH time duration of 2 symbols.

Moreover, base station 120 may configure one or more PDCCH CORESETs for a user device. For example, base station 120 may configure user device 140 with PDCCH CORESET 462 in FIG. 4. Accordingly, base station 120 may determine that PDCCH CORESET 462 of user device 140 is within instant PDCCH time duration 470 when base station 120 intends to transmit a PDCCH to user device 140.

Step 630 includes responsive to a determination that the first control resource set is within the time duration, transmitting a control channel in the first control resource set. For example, base station 120 may determine PDCCH CORESET 462 of user device 140 is within instant PDCCH time duration 470 obtained by user device 140. In response to the determination that PDCCH CORESET 462 of user device 140 is within instant PDCCH duration, base station 120 may transmit a PDCCH on PDCCH candidate 451 and/or 452 to user device 140.

Step 660 includes determining whether a second control resource set is within. the time duration. For example, base station 120 may transmit an instant PDCCH time duration of 3 symbols to user device 140. Base station 120 may also configure user device 140 with PDCCH CORESETS 461 and 463 in FIG. 4. After determining PDCCH CORESET 461 is within the instant PDCCH time duration, base station 120 may determine that PDCCH CORESET 463 is also within the instant PDCCH time duration.

Step 670 includes responsive to a determination that the second control resource set is within the time duration, transmitting the control channel in the second control resource set. For example, base station 120 may determine PDCCH CORESET 463 of user device 140 is within the instant PDCCH time duration of 3 symbols. In response to the determination that the second configured PDCCH CORESET 463 is within the instant PDCCH time duration, base station 120 may transmit a PDCCH on PDCCH candidates 442 on OFDM symbol 433 to user device 140.

In some embodiments, method 600 may include responsive to a determination that the first control resource set is not within the time duration, not transmitting the control channel in the first control resource set. For example, base station 120 may transmit to user device 160 an instant PDCCH time duration of 1 symbol. Base station 120 may also configure user device 160 with PDCCH CORESET 462. In response to a determination that PDCCH CORESET 462 is not within the instant PDCCH time duration, base station 120 may not transmit any PDCCH on PDCCH candidates 451 and 452 in PDCCH CORESET 462 for user device 160.

In some embodiments, method 600 may include responsive to a determination that the first control resource set is partially within the time duration, transmitting the control channel in the first control resource set. For example, base station 120 may transmit user device 160 an instant PDCCH time duration as 1 symbol. Base station 120 may also configure user device 160 with a PDCCH CORESET on both OFDM symbol 431 and 432. In response to a determination that the PDCCH CORESET is partially within the instant PDCCH time duration (i.e., the OFDM symbol 431), base station 120 may transmit a PDCCH in the PDCCH CORESET of user device 160.

In some embodiments, method 600 may include responsive to a determination that the first control resource set is partially within the time duration, not transmitting the control channel in the first control resource set. For example, base station 120 may transmit to user device 160 an instant PDCCH time duration as 1 symbol. Base station 120 may also configure user device 160 with a PDCCH CORESET on both OFDM symbol 431 and 432. In response to a determination that the PDCCH CORESET is partially within the instant PDCCH time duration (i.e., OFDM symbol 431), base station 120 may not transmit any PDCCHs in the configured PDCCH CORESET to user device 160.

In some embodiments, transmitting the time duration of the control region in step 610 may include transmitting the time duration of the control region in the first symbol of a time slot or a scheduling instant. For example, base station 120 may transmit instant PDCCH time duration 470 in OFDM symbol 431 to user device 140.

In some embodiments, transmitting the time duration of the control region in step 610 may include transmitting the time duration of the control region periodically. For example, base station 120 may periodically transmit to use device 140 an updated instant PDCCH time duration 470 every 100 ms.

In some embodiments, transmitting the time duration of the control region in step 610 may include receiving the time duration of the control region semi-statically. For example, base station 120 may semi-statically transmit to use device 140 instant PDCCH time duration 470. Base station 120 may transmit, for example, a radio resource control (RRC) configuration signal including instant PDCCH time duration 470 when an update of the instant PDCCH time duration is needed.

In some embodiments, transmitting the time duration of the control region in step 610 may include transmitting the time duration of the control region based on a whole control region of a cell. For example, base station 120 may broadcast its instant PDCCH time duration in a BCH. All user devices may receive base station 120's instant PDCCH time duration as a whole control region of base station 120. Any user device in coverage 180 may receive the BCH to obtain a size of a whole control region of base station 120.

In some embodiments, base station 120 may signal multiple PDCCH CORESETs for a user device. Base station 120 may use an instant PDCCH time duration covering all of these PDCCH CORESETs of a user device as a whole control region.

In some embodiments, base station 120 may configure the first control resource set on one or more symbols. In FIG. 3, for example, base station 120 may configure PDCCH CORESET 362 on OFDM symbol 332 and 333.

In some embodiments, a first control resource set is configured on one or more symbols, and a second control resource set is configured on one or more symbols which could be different from those configured for the first control resource set. For example, as shown in FIG. 3, base station 120 may respectively configure PDCCH CORESET 361 on OFDM symbol 331, and PDCCH CORESET 362 on symbol 332 and 333. OFDM symbol 331 is not overlapped with OFDM symbols 332 and 333.

In some embodiments, a first control resource set and a second control resource set may be configured on at least a common symbol. For example, base station 120 may configure a PDCCH CORESET on OFDM two symbols #1 and #2, and another PDCCH CORESET on two OFDM symbols #2 and #3. Thus, the two PDCCH CORESETs are configured on a common OFDM symbol #2.

In some embodiments, the first control resource set may be transmitted in a first beam, and the second control resource set may be transmitted in a second beam. For example, base station 120 in FIG. 4 may respectively transmit a PDCCH on PDCCH CORESET 461 in beam 410, and another PDCCH on PDCCH CORESET 462 in beam 420.

In some embodiments, the first control resource set may include a plurality of resource elements (REs), and the control channel is transmitted on at least a part of REs according to a frequency-first mapping, a time-first mapping, or a combination thereof in FIG. 3, for example, base station 120 may configure PDCCH CORESET 362 including PDCCH candidates 351 and 352. PDCCH candidates 351 and 352 each include four REGs, and therefore include a plurality of REs, respectively. In other words, PDCCH CORESET 362 may include a plurality of REs.

When base station 120 transmits a PDCCH on, for example, PDCCH candidate 351, the thin REGs #1, #2, #3, and #4 of PDCCH candidate 351 are used to carry the PDCCH according to a time-first mapping. As shown in FIG. 3, base station 120 may map REG #1 and #2 of PDCCH candidate 351 across OFDM symbols 332 and 333 first and then REG #3 and #4 of PDCCH 351, i.e., the time-first mapping.

Alternatively, base station 120 may transmit a PDCCH on for example, PDCCH candidate 352, the four REGs #1, #2, #3, and #4 of PDCCH candidate 352 are used to carry the PDCCH according to a frequency-first mapping. As shown in FIG. 3, base station 120 may map REG #1 and #2 of PDCCH candidate 352 first across subcarriers in the frequency domain on OFDM symbol 332, and then, across to OFDM symbol 333, REG #3 and #4 or PDCCH 352, i.e., the frequency-first mapping.

In another example, base station 120 may transmit a PDCCH on both PDCCH candidates 351 and 352. According to the time-first and the frequency-first mappings described in the above two examples on PDCCH candidates 351 and 352, base station 120 may transmit the PDCCH on both PDCCH candidates 351 and 352 according to a combination of the time-first and the frequency-first mappings.

In some embodiments, transmitting a control channel in step 630 may include transmitting the control channel an a part of REs. For example, when user device 160 is configured with PDCCH CORESET 462, base station 120 may transmit a PDCCH to user device 160 on either PDCCH candidate 451 or 452. Base station 120 may transmit the PDCCH on REGs of PDCCH candidate 451 or REGs of PDCCH candidate 452.

Figure 7:
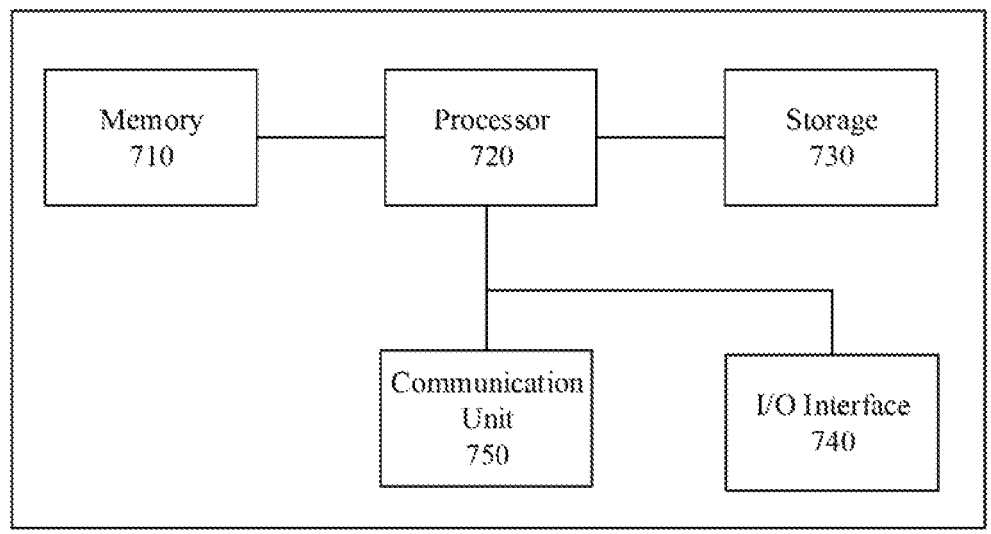
FIG. 7 is a schematic diagram of an exemplary user device for detecting a control channel in a wireless communication system, according to some embodiments of the present application.

FIG. 7 is a schematic diagram of an exemplary user device 700 for detecting a control channel in a wireless communication system, according to some embodiments of the present application. User device 700 may include a memory 710, a processor 720, a storage 730, an ISO interlace 740, and a communication unit 750. One or more of the components of user device 700 may be included for detecting control Channels in a wireless communication system. These units may be configured to transfer data and send or receive instructions between or among each other.

Processor 720 may include any appropriate type of general-purpose or special-purpose microprocessor, digital signal processor, or microcontroller. For example, processor 720 may be configured to receive the time duration, i.e., the number of OFDM symbols for PDCCH transmission, from base station 120. In some embodiments, processor 720 may be configured to obtain the time duration of the control region intended for user device 700. For example, processor 720 may be configured to receive instant PDCCH time duration 470 in FIG. 4 from user device 700's previous PDCCHs periodically. Alternatively, processor 720 may be configured to obtain the time duration of the control region from a broadcast system information. For example, processor 720 may be configured to receive instant PDCCH time duration 470 from a broadcast channel transmitted by base station 120.

Processor 720 may also be configured to determine whether a control resource set is within the time duration. For example, processor 720 may be configured to obtain instant PDCCH time duration 470 in FIG. 4 as 2 symbols. When user device 700 is configured with PDCCH CORESET 462 in FIG. 4, processor 720 may be configured to determine user device 700's PDCCH CORESET 462 is within instant PDCCH duration 470.

Processor 720 may further configured to, in response to a determination that the control resource set is within the time duration, detect a control channel in the first control resource set. For example, processor 720 may be configured to determine user device 700's configured PDCCH CORESET 462 is within instant PDCCH duration 470. In response to the determination that its PDCCH CORESET 462 is within instant PDCCH time duration 470, processor 720 may be configured to detect its PDCCH on PDCCH candidates 451 and 452.

In some embodiments, processor 720 may be configured to determine whether another control resource set is within the time duration. For example, user device 700 may obtain an instant PDCCH time duration as 3 symbols when user device 700 is configured with PDCCH CORESETs 461 and 463. After determining PDCCH CORESET 461 is within the instant PDCCH time duration, processor 720 may be configured to determine that PDCCH CORESET 463 is also within the instant PDCCH time duration.

Processor 720 may be configured to, in response to a determination that the another control resource set is within the time duration, detect the control channel in the another control resource set. For example, processor 720 may be configured to determine its PDCCH CORESET 463 is within the instant PDCCH time duration after determining PDCCH CORESET 461 is within the instant PDCCH time duration. In response to the determination that its second configured PDCCH CORESET 463 is within the instant PDCCH time duration, processor 720 may be configured to detect user device 700's PDCCH on PDCCH candidates 442 on OFDM symbol 433.

In some embodiments, processor 720 may also be configured to perform one of those steps described above for method 500.

Memory 710 and storage 730 may include any appropriate type of mass storage provided to store any type of information that processor 720 may need to operate. Memory 710 and storage 730 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 710 and/or storage 730 may be configured to store one or more computer programs that may be executed by processor 720 to perform exemplary detecting control channels in a wireless communication system disclosed in this application.

Memory 710 and/or storage 730 may be further configured to store information and data used by processor 720. For instance, memory 710 and/or storage 730 may be configured to store a received instant PDCCH time duration, a previous instant PDCCH time duration, a default instant PDCCH time duration, and PDCCH CORESETs.

I/O interface 740 may be configured to facilitate the communication between user device 700 and other apparatuses. For example, I/O interface 740 may receive a signal from another apparatus e.g., a computer) that system configuration for user device 700. I/O interface 740 may also output data of detecting statistics to other apparatuses.

Communication unit 750 may include one or more cellular communication modules, including, for example, a 5G new radio system, a Long-Term Evolution (LTE), a High Speed Packet Access (HSPA), a Wideband Code-Division Multiple Access (WCDMA), and/or a Global System for Mobile communication (GSM) communication module.

Figure 8:
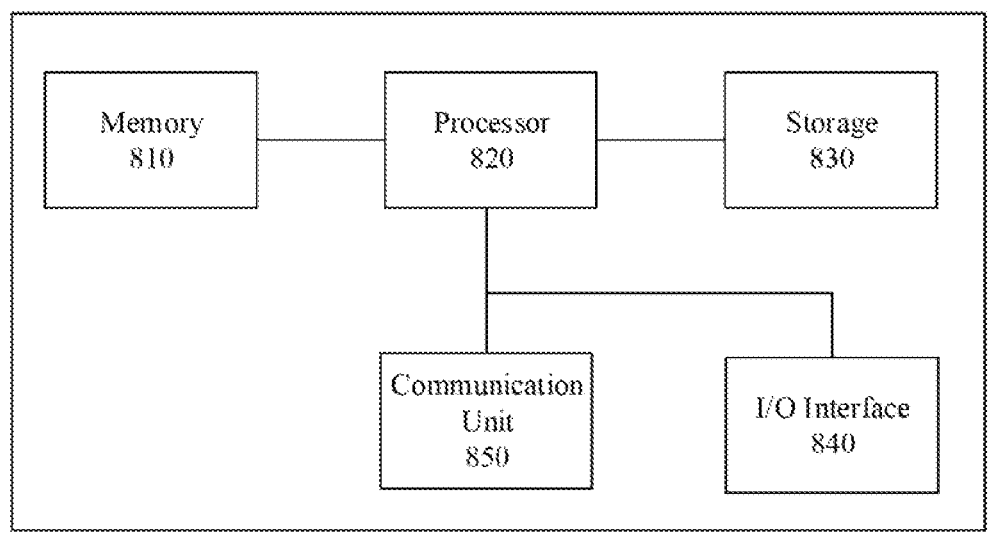
FIG. 8 is a schematic diagram of an exemplary network apparatus for transmitting a control channel a wireless communication system, according to some embodiments of the present application.

FIG. 8 is a schematic diagram of an exemplary network apparatus 800 for transmitting a control channel in a wireless communication system, according to some embodiments of the present application. Network apparatus 800 may include a memory 810, a processor 820, a storage 830, an I/O interface 840, and a communication unit 850. One or more of the components of network apparatus 800 may be included for transmitting control channels in a wireless communication system. These units may be configured to transfer data and send or receive instructions between or among each other.

Processor 820 may include any appropriate type of general-purpose or special-purpose microprocessor, digital signal processor, or microcontroller. Processor 820 may be configured to transmit a time duration of a control region. Processor 820 may be configured to transmit the time duration of the control region for all user devices, a group of user devices, or a user device in coverage 180. For example, processor 820 may be configured to transmit instant PDCCH time duration 470 in FIG. 4 in user device 140's PDCCHs periodically.

Alternatively, processor 820 may be configured to broadcast system information including the time duration of the control region for all user device in coverage 180. For example, processor 820 may be configured to transmit instant PDCCH time duration 470 in a broadcast channel (BCH) of network apparatus 800.

Processor 820 may also he configured to determine whether a first control resource set is within the time duration. For example, processor 820 may be configured to transmit instant PDCCH time duration 470 as 2 symbols for all user devices, a group of user devices, or a user device. Base station 120 in any of these configurations may know that user device 140 has an instant PDCCH time duration of 2 symbols.

Moreover, processor 820 may be configured to configure one or more PDCCH CORESETs for a user device. For example, processor 820 may be configured to configure user device 140 with PDCCH CORESET 462 in FIG. 4. Accordingly, processor 820 may be configured to determine that PDCCH CORESET 462 of user device 140 is within instant PDCCH time duration 470 when base station 120 intends to transmit a PDCCH to user device 140.

Processor 820 may further be configured to, in response to a determination that the first control resource set is within the time duration, transmit a control channel in the first control resource set. For example, processor 820 may be configured to determine PDCCH CORESET 462 of user device 140 is within instant PDCCH time duration 470. In response to the determination that PDCCH CORESET 462 of user device 140 is within instant PDCCH duration, processor 820 may be configured to transmit a PDCCH on PDCCH candidate 451 and or 452 to user device 140.

Processor 820 may be configured to determine whether a second control resource set is within the time duration. For example, processor 820 may be configured to transmit an instant PDCCH time duration of 3 symbols to user device 140. Processor 820 may also be configured to configure user device 140 with PDCCH CORESETs 461 and 463 in FIG. 4. After determining PDCCH CORESET 461 is within the instant PDCCH time duration, processor 820 may be configured to determine that PDCCH CORESET 463 is also within the instant PDCCH time duration.

Processor 820 may be configured to, in response to a determination that the second control resource set is within the time duration, transmit the control channel in the second control resource set. For example, processor 820 may be configured to determine PDCCH CORESET 463 of user device 140 is within the instant PDCCH time duration of 3 symbols. In response to the determination that the second configured PDCCH CORESET 463 is within the instant PDCCH time duration, processor 820 may be configured to transmit a PDCCH on PDCCH candidates 442 on OFDM symbol 433 to user device 140.

In some embodiments, processor 820 may also be configured to perform one of those steps described above for method 600.

Memory 810 and storage 830 may include any appropriate type of mass storage provided to store any type of information that processor 820 may need to operate. Memory 810 and storage 830 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 810 and/or storage 830 may be configured to store one or more computer programs that may be executed by processor 820 to perform exemplary transmitting control channels in a wireless communication system disclosed in this application.

Memory 810 and/or storage 830 may be further configured to store information and data used by processor 820. For instance, memory 810 and/or storage 830 may be configured to store system information, an instant PDCCH time duration for each user device, a previous instant PDCCH time duration, a default instant PDCCH time duration, and CORESETs for each user device.

I/O interface 840 may be configured to facilitate the communication between network apparatus 800 and other apparatuses. For example, I/O interface 840 may receive a signal from another apparatus (e.g., a computer) that system configuration for network apparatus 800. I/O interface 840 may also output data of transmitting statistics to other apparatuses.

Communication unit 850 may include one or more cellular communication modules, including, for example, a 5G new radio system, a Long-Term Evolution (LTE), a High Speed Packet Access (HSPA), to Wideband Code-Division Multiple Access (WCDMA), and/or a Global System for Mobile communication (GSM) communication module.

In some aspects, the present application is directed to a non-transitory computer-readable medium storing instructions, which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

The invention claimed is:

1. A method for a wireless communication, performed by a network device, the method comprising:
   transmitting a time duration of a control region;
   determining whether a first control resource set is within the time duration;
   responsive to a determination that the first control resource set is within the time duration, transmitting a control channel in the first control resource set;
   determining whether a second control resource set is within the time duration;
   responsive to a determination that the second control resource set is within the time duration, transmitting the control channel in the second control resource set; and
   responsive to a determination that the first control resource set is partially within the time duration, not transmitting the control channel in the first control resource set,
   wherein a search space associated with the first control resource set and a search space associated with the second control resource set are configured on at least a common symbol.

2. The method of claim 1, wherein transmitting the time duration of the control channel comprises:
   transmitting the time duration of the control region in the first symbol of a time slot or a scheduling instant;
   transmitting the time duration of the control region periodically;
   transmitting the time duration of the control region semi-statically;
   transmitting a size of a whole control region of a cell; or any combination thereof.

3. The method of claim 1, wherein
   the first control resource set is configured on one or more symbols, and
   the second control resource set is configured on one or more symbols.

4. The method of claim 1, wherein the first control resource set is transmitted in a first beam, and the second control resource set is transmitted in a second beam; and
   wherein transmitting the control channel in the first control resource set comprises transmitting the control channel on at least a part of resource elements (REs).

5. A network device, comprising:
   a memory storing instructions; and
   a processor communicatively coupled to the memory,
   wherein the instructions, when executed by the processor, cause the processor to perform operations comprising:
   transmitting a time duration of a control region;
   determining whether a first control resource set is within the time duration;
   responsive to a determination that the first control resource set is within the time duration, transmitting a control channel in the first control resource set;
   determining whether a second control resource set is within the time duration;
   responsive to a determination that the second control resource set is within the time duration, transmitting the control channel in the second control resource set; and
   responsive to a determination that the first control resource set is partially within the time duration, not transmitting the control channel in the first control resource set,
   wherein a search space associated with the first control resource set and a search space associated with the second control resource set are configured on at least a common symbol.

6. The network device of claim 5, wherein the first control resource set is configured for a user device to detect the user device's control channel.

7. The network device of claim 5, wherein transmitting the time duration of the control channel comprises:
   transmitting the time duration of the control region in the first symbol of a time slot or a scheduling instant;
   transmitting the time duration of the control region periodically;
   transmitting the time duration of the control region semi-statically;
   transmitting a size of a whole control region of a cell; or any combination thereof.

8. The network device of claim 5, wherein the first control resource set is configured on one or more symbols.

9. The network device of claim 5, wherein the second control resource set is configured for a user device to detect the user device's control channel.

10. The network device of claim 5, wherein
    the first control resource set is configured on one or more symbols, and
    the second control resource set is configured on one or more symbols.

11. The network device of claim 5, wherein
    the first control resource set is transmitted in a first beam, and
    the second control resource set is transmitted in a second beam.

12. The network device of claim 5, wherein
    the first control resource set comprises a plurality of resource elements (REs), and
    transmitting the control channel in the first control resource set comprises transmitting the control channel on at least a part of REs according to a frequency-first mapping, a time-first mapping, or a combination thereof.

13. The network device of claim. 11, wherein transmitting the control channel in the first control resource set comprises transmitting the control channel on at least a part of REs.

* * * * *